3,546,268
METHOD FOR PRODUCING UNSATURATED NITRILES

Yoneichi Ikeda and Masaharu Tashiro, Yokohama, and Kantaro Yamada and Toshio Nakamura, Tokyo, Japan, assignors to Nitto Chemical Industry Co., Ltd., Tokyo, Japan, a corporation of Japan
No Drawing. Filed July 9, 1968, Ser. No. 743,310
Claims priority, application Japan, July 13, 1967, 42/44,689
Int. Cl. C07c $121/02, 121/32$
U.S. Cl. 260—465.3  9 Claims

ABSTRACT OF THE DISCLOSURE

Acrylonitrile or methacrylonitrile is produced with reduction of the amount of ammonia used and increase of yield of desired product by a method which comprises contacting a mixture of propylene or isobutylene, ammonia and oxygen in vapor phase with an oxidizing fluidized solid catalyst which is also active to ammonia at a high temperature, wherein a part of the starting ammonia is fed into a reactor at a position higher than the feed position of the other starting gases.

---

This invention relates to an improved method for producing an olefinic unsaturated nitrile by ammonoxidation of olefins. More particularly, it relates to a method for producing an olefinic unsaturated nitrile by reacting an olefin, ammonia and molecular oxygen in vapor phase at a high temperature in the presence of a fluidized solid catalyst, in which the yield of the olefinic unsaturated nitrile, for example, acrylonitrile per one pass through the catalyst bed is remarkably improved by feeding a part of the starting ammonia (referred to hereinafter as the split ammonia) into the fluidized bed which is at a higher position than the feeding position of the other starting gases (that is, olefin, molecular oxygen, the remaining ammonia, and water when this is used).

Regarding the method for producing the corresponding unsaturated nitrile by reacting an olefin with ammonia and molecular oyygen, many proposals have been made, but they are mostly concerned with the compositions of catalyst used.

The inventors have made a study of the production of an unsaturated nitrile on an industrial scale from another viewpoint, that is, from the chemical reaction engineering standpoint and as the result, they found a method which enables us to produce the desired unsaturated nitrile in a high yield by a simple improvement.

In the production of an unsaturated nitrile using a catalyst which is also active to ammonia such as containing molybdenum oxide or tungsten oxide such as bismuth phosphomolybdate, tellurium phosphomolybdate and bismuth phosphotungstate, the conventional method in which reaction gases are fed into a fluidized bed reactor at the same or approximately the same position requires ammonia in excess of the theoretical amount to effect the reaction for the formation of nitrile because a considerable amount of ammonia burns. For example, the theoretical amount of ammonia required per mol of propylene is about 0.93 mol (when the amounts of acrylonitrile, acetonitrile, and hydrogen cyanide produced from one mol of propylene are 0.6 mol, 0.08 mol and 0.07 mol, respectively), though ammonia is usually used in a larger amount, for example, about 1.2 mols per mol of propylene [U.S. Pat. 2,904,580 (or British Pat. 867,438, German Pat. 1,127,351), Tables I and II].

However, the experiments conducted by the inventors show the following fact: The combustion reaction of ammonia (namely, $NH_3+O_2 \rightarrow N_2+H_2O$) is more easily affected by its concentration than nitrile formation reaction, and the higher the concentration of ammonia, the larger the combustion amount of ammonia. Therefore, when an excess of ammonia is present during nitrile formation reaction, the excess ammonia is entirely spent for only the combustion reaction and is useless for nitrile formation reaction. However, when a small excess of ammonia is used, ammonia required for nitrile formation reaction often becomes short at the latter half of reaction and this causes the reduction of yield of unsaturated nitrile. Therefore, only the required minimum amount of ammonia is fed into the bottom of a fluidized catalyst bed together with an olefin and the other starting gases (i.e. an amount of ammonia corresponding to the amount of olefin reacted in the lower part of the bed is fed), and with the progress of the reaction, the remaining ammonia is fed into the fluidized bed at a higher position than the position at which said starting gases are fed, whereby it becomes possible to reduce the ammonia consumption without shortage of ammonia in the latter reaction zone, and the yield of nitrile is increased.

This invention, which is based on said new idea, relates to a method for producing acrylonitrile or methacrylonitrile by contacting propylene or isobutylene, ammonia and molecular oxygen in vapor phase at a high temperature with an oxidizing fluidized catalyst, in which a part of ammonia is fed into the fluidized bed at a higher position than the position at which the other starting gases (i.e., propylene or isobutylene, molecular oxygen, the remaining ammonia and water if this is used) are fed.

The catalyst which may be used in the method of this invention includes all catalysts capable of producing acrylonitrile (or methacrylonitrile) in the reaction of propylene (or isobutylene), oxygen and ammonia and simultaneously having activity to ammonia. The catalysts which are desirable in this invention are those which belong to the group consisting of bismuth phosphomolybdate, bismuth molybdate, bismuth phosphotungstate, tellurium phosphomolybdate and tellurium molybdate and among them, bismuth phosphomolybdate is most suitable.

The catalysts used in the method of this invention may be said metal oxides alone or those supported on a carrier. Any conventional carrier for catalyst may be used and typical examples thereof are silica and alumina. Generally, the carrier is used in an amount smaller than 90% of the weight of the final catalyst product. Further, the catalyst used preferably has a size of 1–500 microns.

It is necessary that the molar ratio of oxygen/olefin in the starting gases fed into a reactor is about 1 to about 4, and preferably about 1.5 to about 3. The molar ratio of ammonia/olefin in the starting mixture is preferably about 0.5 to about 2 and most preferably about 1.0 to about 1.5.

Any oxygen sources may be employed, but air is preferred from the economical viewpoint. The starting olefin does not necessarily have high purity and may contain an unsaturated hydrocarbon such as propane, butane, etc. The starting ammonia may be that used for fertilizer.

Furthermore, water may be contained in the reaction mixture, if necessary. In this case, the molar ratio of water/olefin may vary within the range of about 0.5 to about 10, though the range of about 1 to about 3 is preferred.

The reaction temperature is within the range of 350°–600° C., and most preferably 450°–500° C.

The reaction pressure is from approximately the atmospheric pressure to about 5 kg./cm.² gage and most preferably 0.5–3 kg./cm.²/gage.

The apparent contact time may be about 1 to about 20 seconds, preferably about 3 to about 10 seconds.

The fluidized bed reactor used in this invention may be of any type. That is, any reactors which are suitable for carrying out a reaction by contacting suspended solid powder with gases may be used.

In order to effectively carry out the method of this invention in which a part of ammonia is fed into the fluidized bed at a higher position than the position at which the other reaction gases are fed, about 50 to about 90% of the total amount of the starting ammonia (preferably about 60 to about 85%) is fed into the reactor at the same or nearly same position as the position at which the other feed gases are fed and about 10 to about 50% to ammonia (the split ammonia) is fed into the fluidized bed at a higher position than the position at which the other starting gases are fed. The position at which the split ammonia is fed means a height of about 5 to about 50% of the height of the fluidized catalyst bed (the height of the catalyst bed at a fluidized state). Feeding the split ammonia into the upper half of the fluidized bed height has substantially no effect. It is especially preferable to feed the split ammonia at the position which is about 15 to about 35% from the bottom of the fluidized catalyst bed height.

The number of feed inlets of the split ammonia fed at a position higher than the bottom of the bed is not critical, but may be more than one. Further, such feed inlets may be vertically arranged. For example, the feed inlet for the split ammonia may be provided only at the position of 20% from the bottom of the fluidized bed height and also may be provided at the positions of 20% and 30% from the bottom of the fluidized bed height, from which the split ammonia may be fed in an optional ratio. The split ammonia may be fed through a thin and prolonged feed inlet along the height of about 5% to about 50% from the bottom of the fluidized layer. The thin and prolonged feed inlet may be in the form of a porous plate.

As the construction of the feed inlet for the gases fed from the bottom, a conventional dispersing means, such as porous plate, perforated plate and plural nozzles, may be used, and as feed inlet for the split ammonia for example, plural nozzles and porous plate may also be used. The construction of the feed inlet for the split ammonia may or may not be the same as that for the gases fed from the bottom. Furthermore, the feeding direction of the split ammonia may be upward, downward or horizontal. The vertical distance between the feed inlets for the split ammonia is preferably shorter than that between the feed inlet for the starting reaction gases at the bottom of the bed and the lowest feed inlet for the split ammonia.

The fluidization state of the catalyst in the fluidized bed between the feed inlet for the split ammonia and the feed inlet at the bottom of the bed is not specially different from the fluidization state of the catalyst when no split ammonia is fed. Therefore, no special means is required to be provided between the feed inlet for the split ammonia and the feed inlet at the bottom. However, from the standpoint of prevention of combustion of ammonia, that is, effective utilization of ammonia, which is the purpose of this invention, the provision of an insert such as perforated plate between said two inlets is preferred, whereby the effects of this invention can be enhanced. For example, the method mentioned in U.S. Pat. 3,230,246, according to which perforated elements (the opening area of the perforated elements is 25–50% of the cross-sectional area of the bed), by which the reaction zone is divided into plural sections, are inserted, is a preferable method. The number of the perforated elements inserted between said two inlets may be one, but about three elements can attain a sufficient effect. The perforated element such as a perforated plate prevents the movement of ammonia from the upper feed inlet to the lower portion and increases the effect of feeding ammonia from a plurality of inlets.

The method of this invention will be illustrated by the following comparative examples and examples.

COMPARATIVE EXAMPLE 1

Bismuth phosphomolybdate catalyst which was supported on silica and which had a particle size of about 10–100$\mu$ and an average particle size of about 60$\mu$ was filled in a fluidized bed reactor having an inside diameter of 7.5 cm. and a height of 300 cm. 800 l./hr. of air (0° C., 760 mm. Hg), 147 g./hr. of propylene, and 68.5 g./hr. of ammonia were fed into the reactor from the lower part of fluidized bed to carry out a reaction thereof of 450° C. The following result was obtained. The fluidized catalyst bed height in this case was 120 cm. The yield is shown by the following equation (the same applies hereunder):

Yield (percent) =

$$\frac{\text{Weight of carbon in the product}}{\text{Weight of carbon in the propylene fed}} \times 100$$

| | Yield, precent |
|---|---|
| Acrylonitrile | 63.0 |
| Acetonitrile | 5.8 |
| Hydrogen cyanide | 4.2 |
| Carbon dioxide | 13.8 |
| Carbon monoxide | 6.2 |
| Residual propylene | 7.0 |

EXAMPLE 1

Utterly the same apparatus and conditions as Comparative Example 1 were used to effect the reaction except that the split ammonia was used 41.1 g./hr. of ammonia was fed from the same feed inlet as in Comparative Example 1 and 27.4 g./hr. of ammonia was fed from the feed inlet which is 18 cm. higher than the above lower feed inlet.

The following results were obtained.

| | Yield, percent |
|---|---|
| Acrylonitrile | 66.0 |
| Acetonitrile | 5.6 |
| Hydrogen cyanide | 4.0 |
| Carbon dioxide | 12.2 |
| Carbon monoxide | 5.6 |
| Residual propylene | 6.6 |

EXAMPLE 2

The same apparatus and conditions as Comparative Example 1 were used to effect the reaction except that the split ammonia was used. 41.1 g./hr. of ammonia was fed from the same feed inlet as in Comparative Example 1, 13.7 g./hr. of ammonia at a position 18 cm. higher than said feed inlet, and 13.7 g./hr. of ammonia at a position further 10 cm. higher than said position. The following results were obtained.

| | Yield, percent |
|---|---|
| Acrylonitrile | 67.0 |
| Acetonitrile | 5.6 |
| Hydrogen cyanide | 3.8 |
| Carbon dioxide | 11.6 |
| Carbon monoxide | 5.5 |
| Residual propylene | 6.5 |

EXAMPLE 3

The amount of the split ammonia fed in Example 1 was reduced from 27.4 g./hr. to 18.5 g./hr. Thus, the amount of ammonia was reduced as compared with that of Comparative Example 1, and nevertheless, the reaction was successfully carried out. Approximately the same results as those of Comparative Example 1 were obtained by using the split ammonia.

| | Yield, percent |
|---|---|
| Acrylonitrile | 63.0 |
| Acetonitrile | 5.8 |
| Hydrogen cyanide | 4.3 |
| Carbon dioxide | 14.1 |
| Carbon monoxide | 6.3 |
| Residual propylene | 6.5 |

COMPARATIVE EXAMPLE 2

43 kg. of bismuth phosphomolybdate catalyst which had a particle size of 10–100μ and an average particle size of 60μ and which was supported on silica was filled in a fluidized bed reactor which had an inside diameter of 20.4 cm. and a height of 640 cm. and in which one perforated plate (opening ratio 40%) was provided at the position 10 cm. from the bed bottom and additional eleven perforated plates were provided at a higher position than the position of said plate at intervals of 20 cm. From the lower part of the fluidized bed, 14,500 l./hr. of air (at 0° C., 760 mm. Hg), 1,340 l./hr. of propylene (at 0° C., 760 mm. Hg), and 1,540 l./hr. of ammonia (at 0° C., 760 mm. Hg) were fed and reaction was effected at 470° C. under 1 kg./cm.$^2$-gage to obtain the following results, in which the fluidized catalyst bed height was 196 cm.:

| | Yield, percent |
|---|---|
| Acrylonitrile | 58.4 |
| Acetonitrile | 5.2 |
| Carbon dioxide | 13.9 |
| Carbon monoxide | 7.8 |
| Hydrogen cyanide | 5.6 |

EXAMPLE 4

The same apparatus and conditions as those of Comparative Example 2 were used, but the split ammonia was used. That is, 1,230 l./hr. of ammonia (at 0° C., 760 mm. Hg) (=about 80% of the total amount of ammonia fed) was fed from the same feed inlet as that of Comparative Example 2 and the remaining ammonia (=310 l./hr. at 0° C., 760 mm. Hg) was fed from a feed inlet at a position 59 cm. higher than the position of the same feed inlet as in Comparative Example 2 (30% from the bottom of the fluidized catalyst bed height). The following results were obtained:

| | Yield, percent |
|---|---|
| Acrylonitrile | 61.4 |
| Acetonitrile | 7.7 |
| Carbon dioxide | 13.0 |
| Carbon monoxide | 7.5 |
| Hydrogen cyanide | 5.9 |

EXAMPLE 5

The same apparatus and conditions as in Example 4 were employed, but the amount of the split ammonia was changed. That is, 1,080 l./hr. of ammonia (at 0° C., 760 mm. Hg) (=about 70% of the total amount of the fed ammonia) was fed from the same feed inlet as in Comparative Example 2 and the remaining ammonia (460 l./hr. at 0° C., 760 mm. Hg) was from a feed inlet at a higher position than the position of said inlet. The following results were obtained.

| | Yield, percent |
|---|---|
| Acrylonitrile | 60.9 |
| Acetonitrile | 7.6 |
| Carbon dioxide | 14.0 |
| Carbon monoxide | 6.5 |
| Hydrogen cyanide | 5.7 |

EXAMPLE 6

The same apparatus and conditions as of Comparative Example 2 were used to effect reaction except that the amount of ammonia fed was reduced to 1,310 l./hr. (at 0° C., 760 mm. Hg) and 1,050 l./hr. (at 0° C., 760 mm. Hg) thereof (about 80% of the total amount of ammonia fed) was fed from the same feed inlet as in Comparative Example 2 and the remaining ammonia (=260 l./hr. at 0° C., 760 mm. Hg) was fed from a feed inlet located in a position 59 cm. higher than the position of the inlet of Comparative Example 2. The following results were obtained:

| | Yield, percent |
|---|---|
| Acrylonitrile | 60.8 |
| Acetonitrile | 7.4 |
| Carbon dioxide | 14.3 |
| Carbon monoxide | 7.8 |
| Hydrogen cyanide | 5.3 |

What is claimed is:

1. A method for producing acrylonitrile or methacrylonitrile by the oxidation of propylene or isobutylene, which comprises contacting a mixture of ammonia, oxygen and an olefin selected from the group consisting of propylene and isobutylene in vapor phase with an oxidizing fluidized solid catalyst selected from the group consisting of bismuth phosphomolybdate, bismuth molybdate, bismuth phosphotungstate, tellurium phosphomolybdate and tellurium molybdate at a temperature of about 350 to about 600° C. under a pressure of approximately atmospheric pressure to 5 kg./cm.$^2$ gage, characterized in that ammonia in an amount of about 50 to about 90% of the total amount of feed ammonia is fed into a fluidized bed reactor from the bottom portion thereof which is substantially the same feed position as that of the olefin and oxygen and the split ammonia is fed at a position which is within the range of about 5 to about 50% from the bottom of the fluidized catalyst bed height and which is higher than the feed position for the other starting gases.

2. A method according to claim 1, wherein the oxidizing fluidized catalyst is bismuth phosphomolybdate.

3. A method according to claim 1, wherein a mixture of an olefin selected from the group consisting of propylene and isobutylene, ammonia, oxygen and steam is used as the starting material.

4. A method according to claim 1, wherein ammonia in an amount of about 60 to about 85% of the total amount of feed ammonia is fed into a fluidized bed reactor from the bottom portion of the bed which is substantially the same feed position as that for olefin and oxygen.

5. A method according to claim 1, wherein the split ammonia is fed into the fluidized bed reactor at a position which is within the range of about 15 to about 35% from the bottom of the fluidized catalyst bed height and which is higher than the feed position of the other starting gases.

6. A method for producing acrylonitrile by oxidation of propylene which comprises contacting a mixture of propylene, ammonia, and oxygen in a molar ratio of ammonia/propylene of about 1.0 to about 1.5 and a molar ratio of oxygen/propylene of about 1.5 to about 3 in vapor phase with a fluidized catalyst composed of bismuth phosphomolybdate supported on silica at a temperature of about 450 to about 500° C. under a pressure of about 0.5 to about 3 kg./cm.$^2$ gage, characterized in that ammonia in an amount of about 50 to about 90% of the total amount of feed ammonia is fed into a fluidized bed reactor from the bottom portion thereof which is substantially the same feed position as that of olefin and oxygen and the split ammonia is fed at a position which is within the range of about 5 to about 50% from the bottom of the fluidized catalyst bed height and which is higher than the feed position of the other starting gases.

7. A method, according to claim 6, wherein ammonia in an amount of about 60 to about 85% of the total amount of feed ammonia is fed into the fluidized bed reactor from the bottom position thereof which is substantially the same feed position as that for oxygen and propylene and the split ammonia is fed at a position which is within the range of about 15 to about 35% from the bottom of the fluidized catalyst bed height and which is higher than the feed position of the other starting gases.

8. A method, according to claim 6, wherein a fluidized bed reactor in which at least one perforated element by which the reaction zone is divided into at least an upper section and a lower section is provided between the feed inlet for ammonia at the bottom portion of the fluidized bed and the feed inlet for the split ammonia at a position higher than the position of the inlet at the bottom portion.

9. A method according to claim 6, wherein air is used as an oxygen source.

References Cited
UNITED STATES PATENTS

| | | | |
|---|---|---|---|
| 3,254,110 | 5/1966 | Sennewald et al. | 260—465.3 |
| 3,472,892 | 10/1969 | Callahan et al. | 260—465.3 |

JOSEPH P. BRUST, Primary Examiner